United States Patent

Bueler

[15] 3,700,286
[45] Oct. 24, 1972

[54] CONTROL VALVE
[72] Inventor: Richard C. Bueler, Glendale, Mo.
[73] Assignee: Wagner Electric Corporation, Newark, N.J.
[22] Filed: March 26, 1970
[21] Appl. No.: 22,903

[52] U.S. Cl. .............303/6 C, 188/151 A, 188/349, 200/82 D, 340/52 C, 303/84 A
[51] Int. Cl. .........................B60t 17/22, B60t 11/34
[58] Field of Search....200/82 D; 340/52 C; 188/346, 188/151 A, 349; 303/84, 84 A, 6 C; 60/54.5 E

[56] References Cited

UNITED STATES PATENTS

| | | | |
|---|---|---|---|
| 3,498,681 | 3/1970 | Bueler | 303/6 C |
| 3,556,607 | 1/1971 | Shutt et al. | 303/6 C |
| 3,469,889 | 9/1969 | Bueler | 303/6 C |
| 3,472,559 | 10/1969 | Bueler | 303/6 C |
| 3,480,333 | 11/1969 | Stelzer | 303/6 C |

*Primary Examiner*—George E. A. Halvosa
*Assistant Examiner*—John J. McLaughlin
*Attorney*—Joseph E. Papin

[57] ABSTRACT

A control valve for use in a dual or split braking system which has a proportioning valve therein generally operable to proportion the fluid pressure in one of the systems. The control valve is provided with a shuttle or warning piston movable from a normally centered position to opposed translated positions in response to a predetermined differential between the separate supplied fluid pressures in said systems acting thereon. A by-pass passage is provided in the control valve connected in by-pass relation with the proportioning valve, and a valve member is normally urged toward a position closing said by-pass passage. A lost motion connection is defined between the shuttle piston and valve member wherein said valve member is moved to a position opening the by-pass passage permitting the flow of one of the supplied fluid pressures therethrough in by-pass relation with the proportioning valve to obviate the proportioning function thereof upon the movement of the shuttle piston to one of its translated positions. It is also contemplated that the control valve can include the proportioning valve.

8 Claims, 4 Drawing Figures

Patented Oct. 24, 1972

3,700,286

INVENTOR
RICHARD C. BUELER
BY
Joseph E. Papin

CONTROL VALVE

This invention relates to dual fluid pressure systems and in particular to a by-pass warning valve for use therein.

SUMMARY OF THE INVENTION

In the past by-pass warning type combination control valves employed in a split hydraulic brake system with a split system master cylinder, such as that disclosed in U.S. Pat. No. 3,448,230 issued to Richard C. Bueler on June 3, 1969, a by-pass passage was provided in such control valves for shunting or by-passing one of the fluid pressures supplied by the split system master cylinder around a proportioning valve which was generally operable to proportion the application of the one supplied fluid pressure to the vehicle rear brakes. The by-pass passage was normally closed by one end of a warning piston having an O-ring seal thereon slidable in said by-pass passage. One of the disadvantageous or undesirable features of such past constructions was the possibility of the destruction or cutting of the O-ring seal upon the engagement thereof with the relatively sharp edges about the entry of said by-pass passage when the warning piston was shuttled between its normally centered and translated positions to open and close said by-pass passage. A chamber was also provided in such past control valves forming a portion of the by-pass passage and subjected to the proportioned fluid pressure applied by the proportioning valve to the vehicle rear brakes, and the warning piston in its centered position extended through said chamber into sealing engagement with said by-pass passage. Of course, the warning piston was provided with opposed areas respectively subjected to the separate supplied fluid pressures; therefore, another undesirable or disadvantageous feature was the necessity for maintaining balanced areas on said warning piston which were subjected to the proportioned fluid pressure in said chamber.

The principal object of the present invention is to provide a combination control valve which overcomes the aforementioned disadvantageous features, as well as others; and this, as well as other objects and advantageous features of the present invention, will become apparent hereinafter.

Briefly, the invention comprises a control valve having a housing, means movable in said housing between a normally centered position and opposed translated positions in response to a predetermined differential between separate fluid pressures supplied to said housing, by-pass passage means in said housing for connection in by-pass relation with a valve for modulating one of the supplied fluid pressures, and valve means normally closing said by-pass passage means including means defining a lost motion connection with said first named means for moving said valve means toward a position opening said by-pass passage means and obviating the modulating effect of the modulating valve.

RELATED PATENTS

This patent application is related to U.S. Pat. No. 3,464,741 issued to Edward J. Falk on Sept. 2, 1969, and U.S. Pat. No. 3,448,230 issued to Richard C. Bueler on June 3, 1969, said patents being assigned to the common assignee of this patent application which is a patentably distinct improvement.

DRAWING DESCRIPTION

In the drawings wherein like numerals refer to like parts wherever they occur:

Figure 1:
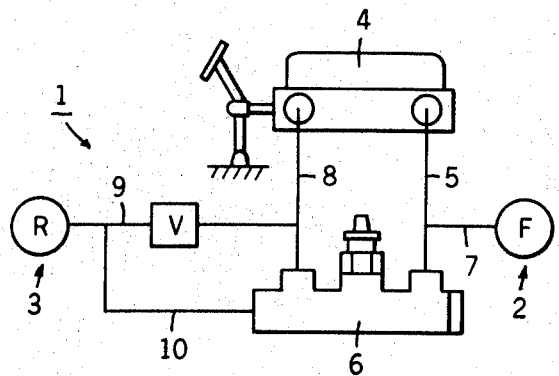
FIG. 1 is a schematic diagram of a dual or split hydraulic brake system showing a control valve embodying the present invention therein.
Figure 4:
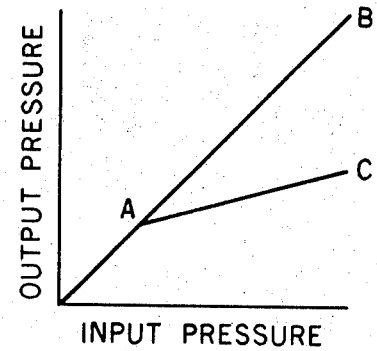
FIG. 4 is a graphical representation of the applied or output fluid pressures effected by the proportioning valve in the system of FIG. 1.

Referring now to the drawings and in particular to FIG. 1, a dual or split hydraulic or fluid pressure brake system 1 is provided with separate or front and rear braking branches, indicated generally at 2, 3 and connected with the separate fluid pressure generating chambers of a dual or split system master cylinder 4, as well known in the art. The front branch 2 is provided with a conduit 5 connected between the split master cylinder 4 and an inlet port of a combination control valve 6, and another conduit 7 branches from the conduit 5 and connects with the vehicle front brakes F. In the rear branch 3, a conduit 8 is connected between the split master cylinder 4 and another inlet port of the control valve 6, and another conduit 9 is connected between said conduit 8 and the vehicle rear brakes R, said conduit 9 having a proportioning valve V of a construction well known in the art interposed therein. To complete the description of the system 1, a by-pass conduit 10 is connected between an outlet port of the control valve 6 and the conduit 9 in by-pass, parallel or shunting relation with the proportioning valve V.

Figure 2:
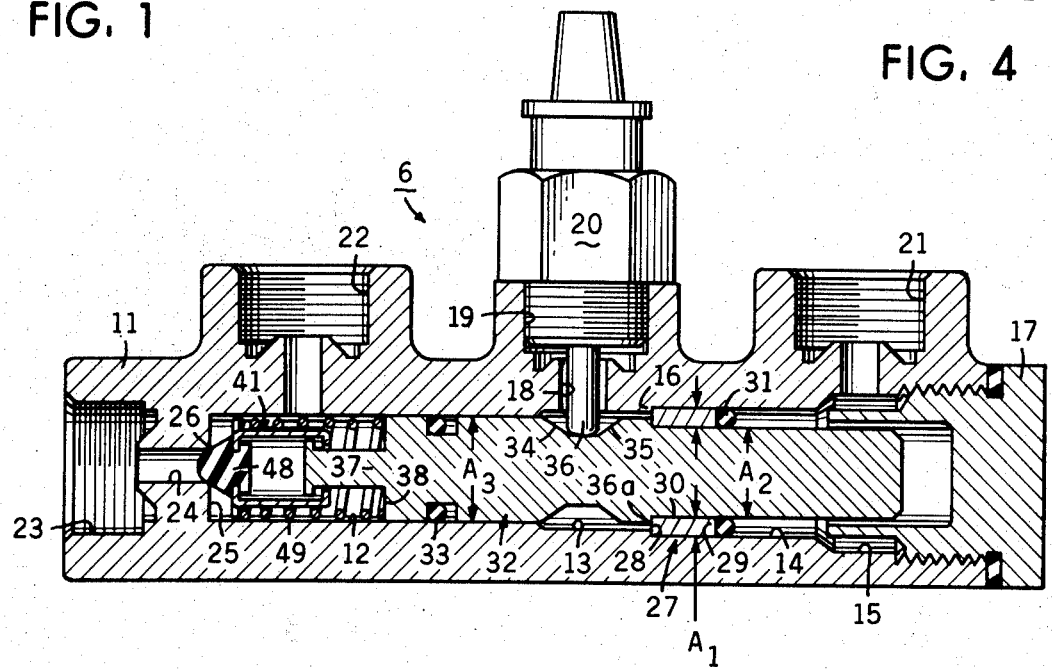
FIG. 2 is a sectional view illustrating the control valve of FIG. 1 embodying the present invention in cross section.

The control valve 6, FIG. 2, is provided with a housing 11 having a bore 12 therein in axial alignment with stepped counterbores 13, 14, 15, and an annular shoulder or abutment 16 is provided in said housing between the counterbores 11, 12. An end plug or closure member 17 is threadedly received in the open end of the counterbore 15, and a cross-bore and counterbore 18, 19 are provided in the housing 2, said cross-bore intersecting with the counterbore 13 and said cross-counterbore being threaded to receive an electrical switch 20, to be discussed hereinafter. Inlet ports 21, 22, which receive conduits 5, 8, as previously mentioned, are provided in the housing 2 intersecting with the counterbore and bore 15, 12, respectively, and an outlet port 23, which receives the conduit 10, as previously mentioned, is also provided in the housing 2. A by-pass passage 24 is provided in the housing 2 having one end connecting with the outlet port 23 and the other end thereof intersecting with an end wall 25 of the bore 12, and a valve seat 26 is provided on said bore end wall about said by-pass passage.

A centering piston, indicated generally at 27, is slidably received in the housing counterbore 14 having opposed ends 28, 29 and a bore 30 therethrough, and the end 28 is normally engaged with the housing shoulder 16 while the end 29 is engaged with an O-ring seal 31 which is also sealably engaged with the housing counterbore 14.

Figure 3:
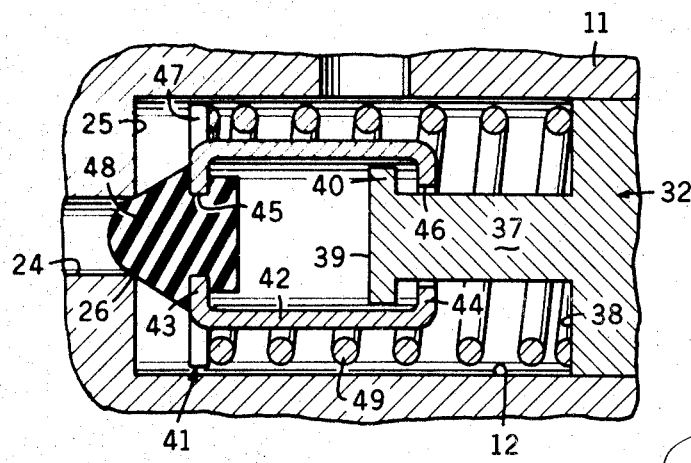
FIG. 3 is an enlarged fragmentary view taken from FIG. 2.

An indicator member, such as the switch actuating piston indicated generally at 32, is slidably received in the housing bore 12 and the centering piston bore 30 extending through the O-ring seal 31 in sealing engagement therewith, and another peripheral seal or O-ring 33 is carried in said switch operating piston 32 in sealing engagement with said housing bore. Opposed cam surfaces 34, 35 are provided on the switch piston 32 adjacent the mid-portion thereof for camming or driving engagement with an operating member 36 of the electrical switch 18, said operating member being normally in a circuit breaking position, as shown, and being movable upwardly toward a circuit making position for energizing a driver warning or dash lamp of a well-known electrical circuit (not shown). An annular shoulder or abutment 36a is also provided on the switch piston 32 and normally positioned in driving or abutting engagement with the leftward end 28 of the centering piston 27. Referring now also to FIG. 3, a reduced extension 37 is provided on the leftward end 38 of the switch piston 32 extending coaxially into the housing bore 12, and having a radially extending free end 39 defining a driving shoulder or abutment 40 thereon for lost motion driving connection with a bypass valve cage or assembly, indicated generally at 41.

The by-pass valve assembly is provided with an annular sleeve portion 42 having integrally formed opposed end walls 43, 44 extending radially inwardly therefrom, and apertures 45, 46 are provided through said end walls, respectively. The sleeve 42 is provided with radially extending tabs or retainers 47, and a resilient insert or valve member 48 is provided on the sleeve end wall 43 extending through the aperture 45 in displacement preventing engagement therewith. A light valve spring 49 of negligible compression is biased between the retainers 47 and the leftward end 38 of the switch piston 32 urging the valve member 48 into sealing engagement with the housing valve seat 26. The switch piston extension 37 extends coaxially through the sleeve aperture 46 in sliding and guiding engagement therewith, and the extension abutment 40 is predeterminately spaced from the sleeve end wall 44 to define a lost motion driving connection therebetween when said by-pass valve 48 is engaged with its seat 26 and the switch piston 32 is in its centered position, as shown.

It should be noted that the centering piston 27 is provided with an annular effective area $A_1$ which is subjected to the fluid pressure at the inlet port 21, and the switch piston 32 is provided with opposed effective areas $A_2$, $A_3$ defined by the sealing engagement thereof with the seal 31 and the sealing engagement of the seal 33 with the housing bore 12, said areas $A_2$, $A_3$ being subjected to the fluid pressures at the inlet ports 21, 22, respectively. The area $A_2$ is additive to the area $A_1$, and the area $A_3$ is greater than the area $A_2$; however, the sum of the additive areas $A_1$, $A_2$ is greater than the area $A_3$.

In the operation with the component parts of the system 1 and control valve 6 positioned as shown in the drawings and as described hereinbefore, operator actuation of the split master cylinder 4 establishes separate substantially equal supplied or input fluid pressures $P_1$, $P_2$ in the branches 2, 3. The supplied fluid pressure $P_1$ flows through the conduits 5, 7 to energize the front brakes F and through the inlet port 21 of the control valve 6 into the counterbores 14, 15 acting on the areas $A_1$, $A_2$ of the centering and switch pistons 27, 32 to establish forces $P_1 A_1$, $P_1 A_2$, respectively. The supplied fluid pressure $P_2$ flows through the conduit 8 and the inlet port 22 of the control valve 6 into the bore 12 acting on the area $A_3$ of the switch piston 32 to establish a force $P_2 A_3$ in opposition to the forces $P_1 A_1$, $P_1 A_2$. Of course, the force $P_1 A_1$ urges the centering piston end 28 toward engagement with the housing shoulder 16, and since the area $A_3$ is greater than the area $A_2$ and the supplied fluid pressures $P_1$, $P_2$ are substantially equal, as previously mentioned, the force $P_2 A_3$ is greater than the force $P_1 A_2$ thereby obviating translatory movement of said switch piston in the leftward direction from its centered position. The additive forces $P_1 A_1$, $P_1 A_2$ are greater than the opposing force $P_2 A_3$ thereby obviating translatory movement of the switch piston 32 in the rightward direction from its centered position. The supplied fluid pressure $P_2$ also flows from the conduit 8 through the conduit 9 into the proportioning valve V which is operable generally to proportionally alter or reduce the magnitude thereof to effect the application of a proportionally reduced output or applied fluid pressure Po for energizing the vehicle rear brakes R. The proportioning function or effect of the proportioning valve V on the supplied fluid pressure $P_2$ is shown in the graph of FIG. 3 wherein the line OAB represents the substantially equal fluid pressures $P_1$, $P_2$ as generated by the split master cylinder 4 and the line AC represents the proportionally applied or output fluid pressure Po from the proportioning valve V. Of course, the applied fluid pressure Po is also effective in the conduit 10 of the branch 3 acting on the effective area of the by-pass valve member 48 in sealing engagement with the housing seat 26; however, the supplied fluid pressure $P_1$ is always at least equal to or greater than the applied fluid pressure Po and acts on the effective area of said by-pass valve member 48 to normally maintain it in seating engagement with the by-pass valve seat 26.

In the event of the failure of the supplied fluid pressure $P_1$ due to a malfunction of the split master cylinder 4 or leaks or the like in the branch 2, the forces $P_1 A_1$, $P_1 A_2$ are eliminated, and the force $P_2 A_3$ acts on the switch piston 32 to effect translatory movement thereof in the rightward direction toward a displaced or translated position engaging the rightward end of said switch piston with the end plug 17. Of course, under such emergency vehicle operating conditions, it is desirable to obviate the proportioning function of the proportioning valve V in order to fully utilize the maximum remaining braking effort of the rear brakes R; therefore, the initial rightward translatory movement of the switch piston 32 moves the extension abutment 40 into lost motion driving engagement with the sleeve end wall 44 of the by-pass valve assembly 41 and thereafter concertedly drives said by-pass valve assembly to the rightward translated position to disengage the by-pass valve 48 from the housing valve seat 26 and open the by-pass passage 24. With the switch piston 32 and by-pass valve 48 in the rightward translated position and the by-pass passage 24 open, the supplied fluid pressure $P_2$ is shunted or by-passed around the proportioning valve V to obviate the proportioning function thereof wherein the proportioned or applied fluid pressure Po is eliminated and the supplied fluid pressure $P_2$ flows through the conduit 8, the control valve inlet port 22, the bore 12, the open by-pass passage 24, the outlet port 23 and the conduits 10, 9 to the vehicle rear brakes R. The rightward translatory movement of the switch piston 32 also drivingly engages the cam surface 34 thereof with the operating member 36 of the electrical switch 20 moving said operating member upwardly to its circuit making position to complete the driver warning circuit and light a driver warning or dash lamp (not shown).

The embodiments of the invention in which an exclusive property or privilege is claimed are defined as follows:

1. A control valve for use in a dual hydraulic brake system having a separate hydraulic pressure supply for each system and having a proportioning valve for one of the systems with the proportioning valve being operable generally for reducing the pressure to that one system, said control valve comprising a housing for connection with the separate pressure supplies, passage means in said housing for connecting the one separate pressure supply in by-pass relation with said proportioning valve, other means for comparing the magnitudes of the pressures of the separate pressure supplies and movable in said housing from a normally centered position toward one of opposed translated positions in response to the pressure of the one pressure supply upon the failure of the other pressure supply, a valve seat in said housing about said passage means, and valve means defining a lost motion connection with said other means in its centered position and normally urged into engagement with said valve seat closing said passage means, said other means being movable to its one translated position through the lost motion connection to drivingly engage and thereafter concertedly move said valve means to a position disengaged from said valve seat opening said passage means for by-passing said proportioning valve to obviate the pressure reducing function thereof.

2. A control valve according to claim 1, comprising a spring means engaged with said valve means normally urging said valve means toward engagement with said valve seat.

3. A control valve according to claim 2, wherein said spring means is engaged between said valve means and said other means.

4. A control valve according to claim 2, wherein said valve means includes an annular sleeve member, opposed end walls on said sleeve member extending radially inward thereof, a valve element for engagement with said valve seat and connected with one of said end walls, aperture means in the other of said end walls, and retainer means on said sleeve member engaged with said spring means, said spring means normally urging said valve element into engagement with said valve seat, extension means on said other means extending through said aperture means into said sleeve member, and an abutment on said extension means for engagement with said other end wall and normally spaced therefrom defining the lost motion connection when said other means is in its centered position, said abutment means being initially movable through the lost motion connection relative to said other end wall into driving engagement therewith and being thereafter further movable to concertedly move said valve means and disengage said valve element from said valve seat to open said passage means upon the movement of said other means to its one translated position.

5. A control valve according to claim 1, comprising a pair of abutment means on said valve means and other means, respectively, and spaced from each other to define the lost motion connection when said other means is in its centered position, one of said abutment means being initially movable relative to the other of said abutment means into driving engagement therewith and being thereafter further movable to disengage said valve means from said valve seat opening said passage means upon the movement of said other means to its one translated position.

6. A control valve according to claim 5, comprising spring means engaged between said valve means and said other means urging said valve means into engagement with said valve seat when said other means is in its centered position and urging said other abutment means toward said one abutment means.

7. A control valve according to claim 1, wherein said valve means includes an annular sleeve member, opposed end walls on said sleeve member extending radially inwardly thereof, one of said end walls defining the lost motion connection for driving engagement with said other means, a valve element connected with the other of said end walls for engagement with said valve seat, and spring means engaged with said valve means urging said valve element into engagement with said valve seat, said valve element being disengaged from said valve seat upon the movement of said other means toward its one translated position through the lost motion connection into driving engagement with said one end wall.

8. A control valve for a dual fluid pressure brake system having a separate pressure supply for each system and means operable generally for modulating one of said systems to vary the pressure thereof under preselected conditions, and an electrical driver warning circuit having a switch therein generally operable for energizing said circuit, said control valve comprising a housing for connection with the separate pressure supplies, a switch actuating piston having opposed end portions respectively subjected to the pressures of the separate pressure supplies and movable in said housing from a normally centered position toward one of opposed translated positions in response to the pressure of one of the pressure supplies acting on one of said opposed end portions upon the failure of the pressure of the other of the pressure supplies, a passage in said housing adjacent to said one end portion for connecting the pressure of the one pressure supply in by-pass relation with said modulating means, a valve seat on said housing about said passage, extension means on said one end portion, valve means movable on said extension means for engagement with said valve seat, spring means engaged between said valve means and one end portion normally urging said valve means into engagement with said valve seat to close said passage when said switch actuating piston is in its centered position, first and second abutments on said extension means and valve means, respectively, and predeterminately spaced from each other to define a lost motion connection therebetween when said valve means is engaged with said valve seat and said switch actuating piston is in its centered position, said first abutment being initially movable through said lost motion connection into driving engagement with said second abutment and thereafter further movable to concertedly drive said valve means to a position disengaged from said valve seat opening said passage and by-passing said modulating means upon the movement of said switch actuating piston to its one translated position, and other means on said switch actuating piston for engagement with said switch to energize said circuit upon the movement of said switch actuating piston to its translated position.

* * * * *